(12) United States Patent
Nirmalakhandan et al.

(10) Patent No.: US 8,080,138 B2
(45) Date of Patent: Dec. 20, 2011

(54) DESALINATION USING LOW-GRADE THERMAL ENERGY

(75) Inventors: Nagamany Nirmalakhandan, Las Cruces, NM (US); Veera Gnaneswar Gude, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 799 days.

(21) Appl. No.: 11/955,074

(22) Filed: Dec. 12, 2007

(65) Prior Publication Data
US 2009/0020406 A1    Jan. 22, 2009

Related U.S. Application Data

(60) Provisional application No. 60/950,076, filed on Jul. 16, 2007.

(51) Int. Cl.
| | |
|---|---|
| *B01D 1/00* | (2006.01) |
| *B01D 3/10* | (2006.01) |
| *C02F 1/04* | (2006.01) |
| *C02F 1/16* | (2006.01) |
| *F25B 27/00* | (2006.01) |

(52) U.S. Cl. ............. 203/11; 62/238.5; 62/430; 62/529; 62/324.1; 159/23; 159/46; 159/47.1; 159/DIG. 16; 202/154; 202/176; 202/183; 202/205; 202/235; 203/10; 203/25; 203/27; 203/91; 203/DIG. 4; 203/DIG. 8; 203/DIG. 17

(58) Field of Classification Search ............. 60/659; 62/238.5, 324.1, 430, 529; 165/185, 902; 159/23, 46, 47.1, DIG. 16; 202/154, 176, 202/181, 183, 205, 235; 203/2, 10, 11, 25, 203/27, 91, DIG. 4, DIG. 8, DIG. 17
See application file for complete search history.

(56) References Cited

U.S. PATENT DOCUMENTS

| | | | |
|---|---|---|---|
| 3,344,041 A | | 9/1967 | Wulfson |
| 3,446,712 A | | 5/1969 | Othmer |
| 3,505,810 A | * | 4/1970 | Gohee .............................. 60/673 |
| 3,854,301 A | * | 12/1974 | Cytryn ............................ 62/101 |
| 4,102,752 A | | 7/1978 | Rugh, II |
| 4,319,965 A | * | 3/1982 | Parker .......................... 202/205 |
| 4,388,812 A | * | 6/1983 | Clark .............................. 62/141 |
| 4,451,334 A | | 5/1984 | Ciocca et al. |
| 4,462,389 A | | 7/1984 | Osdor |
| 4,525,242 A | | 6/1985 | Iida |
| 4,541,246 A | * | 9/1985 | Chang ............................ 60/648 |
| 4,595,460 A | | 6/1986 | Hurt |

(Continued)

FOREIGN PATENT DOCUMENTS

| | | |
|---|---|---|
| FR | 2388767 | 11/1978 |
| GB | 1603574 | 11/1981 |
| JP | 2003-126841 | 5/2003 |
| RU | 715488 | 2/1980 |

OTHER PUBLICATIONS

"Researchers develop low-cost, low energy desalination process", *Sun-News* May 27, 2007.

Gude, Veera G. et al., "Desalination using low-grade thermal energy", *Proceedings of the Third International Conference on Thermal Engineering: Theory and Applications* May 21-23, 2007.

(Continued)

*Primary Examiner* — Virginia Manoharan
(74) *Attorney, Agent, or Firm* — Deborah A. Peacock; Samantha A. Updegraff; Peacock Myers, P.C.

(57) ABSTRACT

This invention describes a low temperature, self-sustainable desalination process operated under natural vacuum conditions created and maintained by barometric pressure head.

13 Claims, 13 Drawing Sheets

U.S. PATENT DOCUMENTS

| | | | | |
|---|---|---|---|---|
| 4,637,218 | A | * | 1/1987 | Tchernev .................. 62/106 |
| 4,686,009 | A | * | 8/1987 | McCabe .................. 202/176 |
| 5,282,979 | A | | 2/1994 | Wilson |
| 5,441,606 | A | * | 8/1995 | Schlesinger et al. ............ 203/39 |
| 5,448,892 | A | * | 9/1995 | Cheng .................. 62/601 |
| 5,552,022 | A | | 9/1996 | Wilson |
| 5,672,250 | A | * | 9/1997 | Ambadar et al. .......... 202/169 |
| 5,953,924 | A | * | 9/1999 | Li et al. .................. 62/71 |
| 6,391,162 | B1 | | 5/2002 | Kamiya et al. |
| 6,607,639 | B1 | | 8/2003 | Longer |
| 6,833,056 | B1 | | 12/2004 | Kamiya et al. |
| 6,919,000 | B2 | | 7/2005 | Klausner et al. |
| 7,073,567 | B2 | * | 7/2006 | Berchowitz .............. 165/48.1 |
| 7,504,739 | B2 | * | 3/2009 | Enis et al. .............. 290/54 |
| 7,615,970 | B1 | * | 11/2009 | Gimlan .................. 320/166 |
| 2007/0084778 | A1 | | 4/2007 | St.Germain et al. |
| 2007/0182160 | A1 | * | 8/2007 | Enis et al. .............. 290/54 |
| 2007/0234749 | A1 | * | 10/2007 | Enis et al. .............. 62/238.2 |
| 2009/0090109 | A1 | * | 4/2009 | Mills et al. .............. 60/659 |

OTHER PUBLICATIONS

Hill, Karl et al., "Researchers develop low-cost, low energy desalination process", *Divining Rod* vol. XXX, No. 2 Jun. 2007, 1-2.

"Low pressure desalination", *Water Power R&D* URL: http://www.rdwaterpower.com/water-desalination-research-and-development/low-pressure-desalination/ Jun. 8, 2007.

Abutayeh, Mohammad et al., "Experimental Simulation of Solar Flash Desalination", *Journal of Solar Energy Engineering* vol. 132, ASME Nov. 2010, 041015-1-041015-7.

Abutayeh, Mohammad et al., "Passive Vacuum Solar Flash Desalination", *AIChE Journal* vol. 56, No. 5 May 2010, 1196-1203.

Abutayeh, Mohammad et al., "Solar Flash Desalination Under Hydrostatically Sustained Vacuum", *Journal of Solar Energy Engineering* vol. 131, ASME Aug. 2009, 031016-1-031016-7.

Alarcon-Padilla, Diego-Cesar et al., "Assessment of an absorption heat pump coupled to a multi-effect distillation unit within AQUASOL project", *Desalination* vol. 212, Elsevier B.V. 2007, 303-310.

Al-Kharabsheh, S. et al., "Experimental study of an innovative solar water desalination system utilizing a passive vacuum technique", *Solar Energy* vol. 75, Elsevier Ltd. 2003, 395-401.

Al-Kharabsheh, S. et al., "Theoretical Analysis of a Water Desalination System Using Low Grade Solar Heat", *Journal of Solar Energy Engineering* vol. 126, ASME May 2004, 774-780.

Al-Kharabsheh, S. et al., "Experimental study of an innovative solar water desalination systen utilizing a passive vacuum technique", *Solar Energy* vol. 75 2003, 395-401.

Al-Kharabsheh, S. et al., "Analysis of an innovative water desalination system using low-grade solar heat", *Desalination* vol. 156, Elsevier Science B.V. 2003, 323-332.

Alva, Luis H. et al., "Simulation of an Air-Cooled Solar-Assisted Absorption Air Conditioning System", *Journal of Solar Energy Engineering* vol. 124, ASME Aug. 2002, 276-282.

Bemporad, G. A., "Basic hydrodynamic aspects of a solar energy based desalination process", *Solar Energy* vol. 54, No. 2, Elsevier Science Ltd. 1995, 125-134.

De Gunzbourg, Jacques et al., "Cogeneration applied to very high efficiency thermal seawater desalination plants", *Desalination* vol. 125 1999, 203-208.

Dincer, I., "Thermal energy storage systems as a key technology in energy conservation", *International Journal of Energy Research* vol. 26, John Wiley & Sons, Ltd. 2002, 567-588.

El-Bahi, A. et al., "Analysis of a parallel double glass solar still with separate condenser", *Renewable Energy* vol. 17, Elsevier Science, Ltd. 1999, 509-521.

Gadhamshetty, V. et al., "Improving air-cooled condenser performance", *ASCE J. of Energy Engrg.* vol. 132, No. 2, ASCE 2002, 276-282.

Gude, Veera G. et al., "Solar Desalination", *Conference Proceedings: session 6 of the UCOWR Conference* URL: http://www.ucowr.siu.edu/proceedings/2006%20Proceedings/2006%20Conference%20Proceedings/Tuesday%20Sessions%206-10/Session%20(6)/6.1.%Gude.pdf Jul. 18, 2006.

Kaligirou, S. A., "Seawater desalination using renewal energy sources", *Prg. in Energy and Combustion Scl.* vol. 31, Elsevier Ltd. 2005, 242-281.

Keren, Y. et al., "Theoretical and experimental comparison of conventional and advanced solar pond performance", *Solar Energy* vol. 51, Pergamon Press. Ltd. 1993, 255-270.

Kern, D. Q. et al., "Extended Surface Heat Transfer", First edition, McGraw-Hill Book Company, New York 1972, 85-202.

Kronenberg, Gustavo et al., "Low-temperature distillation processes in single- and dual purpose plants", *Desalination* vol. 125, Elsevier Science B.V. 1999, 203-208.

Milow, Bernhard et al., "Advanced MED solar desalination plants. Configurations, costs, future—seven years of experience at the Plataformal Solar de Almeria (Spain)", *Desalination* vol. 108, Elsevier Science B.V. 1996, 51-58.

Rohsenow, W. M. et al., "Handbook of Heat Transfer", Third edition, McGraw-Hill Book Company, New York 1985, 6.31-6.41.

Vijayaraghavan, S. et al., "A combined power and cooling cycle modified to improve resource utilization efficiency using a distillation stage", *Energy* vol. 31, Elsevier, Ltd. 2006, 1177-1196.

Wang, S. C., "The exergetic efficiency of MSF Process and the Contributions of Desalination by Waste Heat", *Desalination* vol. 44, Elsevier Sciences Publishers B.V., Amsterdam, The Netherlands 1983, 39-49.

\* cited by examiner

| Parameter | Value | Parameter | Value |
|---|---|---|---|
| Area of EC | 5 m² | TES temperature | 50°C |
| Height of EC | 0.25 m | Condenser diameter | 0.75 m |
| Water depth in EC | 0.1 m | Condenser length | 2 m |
| Feed pipe diameter | 0.31 m | Number of fins | 15 m |
| Withdrawal pipe diameter | 0.62 m | Diameter of fins | 1.25 m |
| Reference temperature | 25°C | Thickness of fins | 0.0025 m |
| Reference concentration | 3.50% | Spacing between fins | 0.125 m |
| Reference density | 1,020 kg/m³ | | |

FIG. 2

| Parameter | Typical value | This example |
|---|---|---|
| Absorber temperature (°C) | 30 | 28 |
| Condenser temperature (°C) | 35 | 55 |
| Evaporator temperature (°C) | 8 | 12 |
| Generator temperature (°C) | 100 | 100 |
| Condenser/Generator pressure (kPa) | 6.27 | 15.75 |
| Absorber/Evaporator pressure (kPa) | 1.073 | 1.403 |
| Energy transfer rate at absorber (kW) | 4.32 | 4.43 |
| Energy transfer rate at condenser (kW) | 3.49 | 3.49 |
| Energy transfer rate at evaporator (kW) | 3.25 | 3.25 |
| Energy transfer rate at generator (kW) | 4.43 | 4.67 |
| Coefficient of performance, COP (-) | 0.73 | 0.72 |

FIG. 5

| Process | Energy required (kJ/kg of product) | | |
|---|---|---|---|
| | Heat energy | Mechanical energy | Total energy |
| Multi-stage flash distillation | 294 | 44 | 338 |
| Proposed process | 192 | 16 | 208 |

FIG. 7

DESALINATION USING LOW-GRADE THERMAL ENERGY

CROSS-REFERENCE TO RELATED APPLICATIONS

This application claims priority to and the benefit of U.S. Provisional Application Ser. No. 60/950,076, entitled "Desalination using Low-Grade Thermal Energy", to Nagamany Nirmalakhandan et al., filed on Jul. 16, 2007, and the specification thereof is incorporated herein by reference.

BACKGROUND OF THE INVENTION

1. Field of the Invention (Technical Field)

The present invention relates to an apparatus and method for desalination.

2. Description of Related Art

Interest in the use of low grade heat sources and recovery of waste heat is growing due to increasing energy costs and declining energy sources. Examples of low grade energy sources include solar energy and heat rejected by fossil fuel-based power plants, air conditioning/refrigeration systems, and industrial processes. As a consequence of the laws of thermodynamics, thermal systems have to reject large quantities of low grade heat energy to the environment. For example, heat rejection rate of modern combined cycle power plants is almost equal to their output. Approaches to utilize waste heat to produce value added products or services can conserve limited energy sources, reduce adverse environmental impacts, and minimize overall costs.

The present invention utilizes low grade heat to operate a new desalination process. Traditional desalination processes such as reverse osmosis, electrodialysis, mechanical vapor compression, and multi-effect flash distillation require electrical energy derived from nonrenewable sources, the cost of which has increased by 10 times over the past 20 years. Recently, a new desalination process has been proposed that has the potential to run solely on low grade heat sources at around 50° C. The present invention is a modification to that process, whereby it can run around the clock, using a thermal energy storage (TES) system that enables waste heat sources and renewable energy sources to be used to drive the process with minimum reliance on grid power. TES manages variable energy demand over time, is a continuous heat source, and has a lower specific energy for desalination. The present invention, unlike the process mentioned above, enables solar collectors and photovoltaic panels to provide the energy to drive the process. The TES system can be maintained at the desired temperature using low grade waste heat from any available source.

BRIEF SUMMARY OF THE INVENTION

A preferred embodiment of the present invention is described below. The embodiment is a desalination system comprising a desalination unit, a low grade heat source for powering the desalination unit and a thermal energy storage system for storing the low grade heat source and maintaining a specified temperature range. The system is able to run continuously within a specified temperature range between approximately 40-50° C. The low-grade heat source is at least partially supplied by an absorption refrigeration unit which maintains the thermal energy storage refrigeration unit at a specified temperature range. The absorption refrigeration unit operates at a pressure range of between approximately 1.4 to 15.75 kPa.

The desalination unit comprises an evaporation chamber, a condenser, a heat exchanger and one or more columns. The columns comprise a saline water column, a brine withdrawal column and a desalinated water column. The heat input to the evaporation chamber is provided by the thermal energy storage system.

The desalination system does not have a pump except for an initial starting pump. In addition, the system does not have any other moving parts.

Another embodiment of the present invention is a method of desalinating comprising the steps of operating a desalination unit, powering the desalination unit using a low grade heat source, storing the low grade heat source in a thermal energy storage unit and maintaining a specified temperature range of the low grade heat source. The desalination unit can run continuously and comprises desalinating saline water at a temperature range of approximately 40-50° C. The method can also comprise supplying the low grade heat source at least partially by an absorption refrigeration unit. The absorption refrigeration unit can also provide a cooling load. The thermal energy storage unit is maintained at a specified temperature range within the absorption refrigeration unit. Finally, the absorption refrigeration unit operates at a pressure range of between approximately 1.4 to 15.75 kPa.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 2 is a table of model parameters used in an example simulation of mass and energy balances of a preferred embodiment;

FIG. 5 is a comparison of parameters in a typical absorption refrigeration system and in the preferred embodiment;

FIG. 7 is a comparison of the preferred embodiment with a multi-stage flash distillation process;

DETAILED DESCRIPTION OF THE INVENTION

This invention concerns the feasibility of a new desalination process utilizing low grade thermal energy. The process operates at near-vacuum pressures created by passive means. This allows for the process to operate at low temperatures with higher efficiency. The process utilizes low grade thermal energy rejected by an absorption refrigeration system (ARS). The condenser of the ARS rejects low grade thermal energy at approximately 55° C. which is recovered and stored in a low temperature thermal energy storage (TES) tank. A thermal energy storage tank serves best to manage energy demands of the desalination process by maintaining the source temperature at approximately 50-70° C. as the energy demand to the desalination system is dependent on the ambient temperature.

Results of this feasibility study show that the thermal energy rejected by an ARS of cooling capacity of approximately 3.25 kW (0.975 tons of refrigeration) along with an additional energy input of approximately 208 kJ/kg of desalinated water is adequate to produce desalinated water at an average rate of approximately 4.5 kg/hr. Energy demand for this process is competitive with well-established Multi Stage Flash distillation processes. An integrated process model and performance curves of the proposed approach are presented below. The effect of process parameters, such as withdrawal rate, are also presented below.

Figure 1:
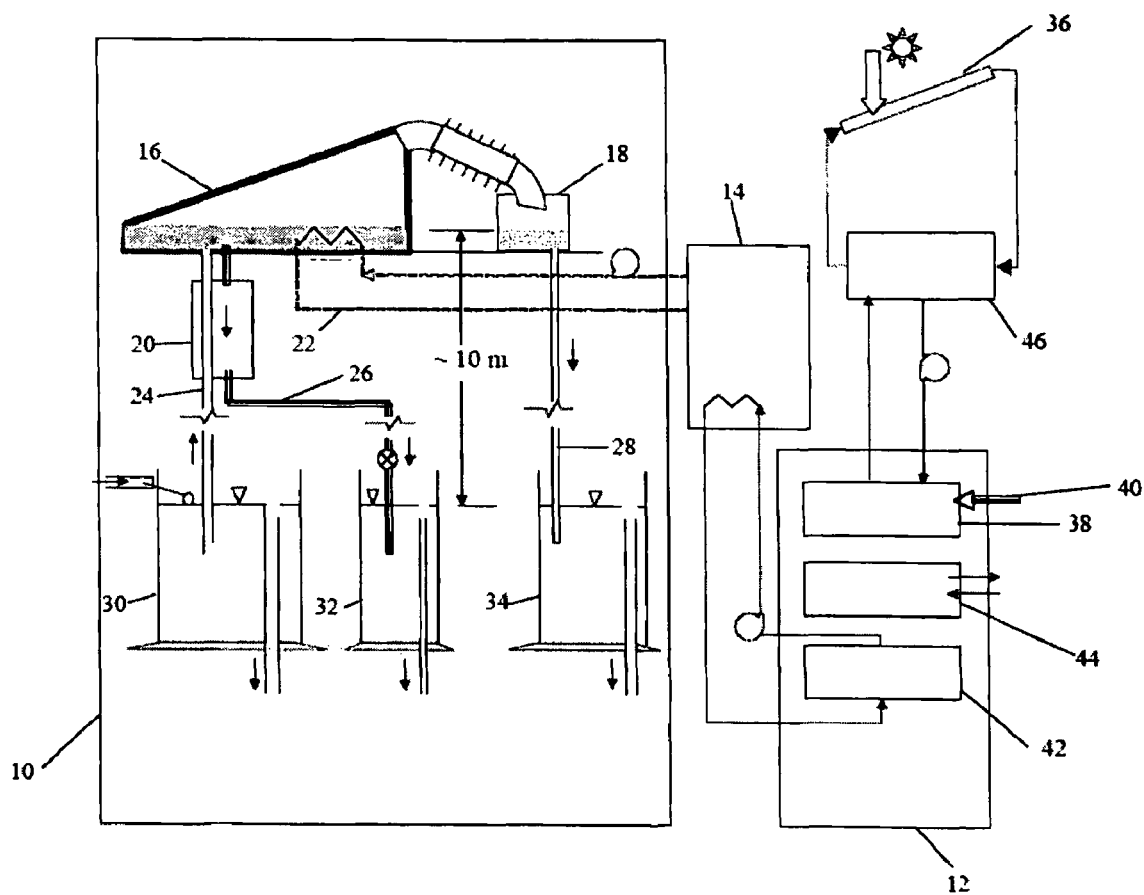
FIG. 1 is a schematic of a preferred embodiment of the desalination system of the present invention.

The preferred embodiment of the desalination system of the present invention is shown schematically in FIG. 1. The invention comprises desalination unit 10, absorption refrigeration system 12, and thermal energy storage 14. Desalination unit 10 comprises evaporation chamber 16, condenser 18, one or more heat exchangers 20, 22, and columns 24, 26 and 28 (e.g. between approximately 10-11 m tall, equivalent to the local barometric head). These three columns are saline water column 24, brine withdrawal column 26, and desalinated water column 28, each with its own constant-level holding tank, saline water tank 30, brine tank 32, and desalinated water tank 34, respectively. The heat input to evaporation chamber 16 is provided by thermal energy storage 14, which is maintained at a particular temperature or range (e.g. between approximately 50-70° C.) by absorption refrigeration system 12, preferably powered by solar energy.

Holding tanks, saline water tank 30, brine tank 32, and desalinated water tank 34 are installed at ground level while, evaporation chamber 16 is installed atop three columns 24, 26, 28 at a barometric height (e.g. between approximately 10-11 m, equivalent to the local barometric head) above the free surface in holding tanks 30, 32, 34 to create a natural vacuum in the headspaces of three columns 24, 26, 28. This configuration enables the desalination process to proceed preferably without any mechanical pumping. There are also preferably no other moving parts needed, except for the pump used to start the system. The temperature of the head space of the feed water column is maintained slightly higher, approximately 45-65° C. than that of the desalinated water column, approximately 15-35° C. Since the head spaces are at near-vacuum level pressures, a temperature differential (e.g. between approximately 10-25° C.) is adequate to evaporate water from the feed water side and condense in the desalinated water side. In this manner, saline water can be desalinated at between approximately 40-50° C., which is in contrast to the 60-100° C. range in traditional solar stills and other distillation processes. Brine is withdrawn continuously from evaporation chamber 16 flowing through tube-in-tube heat exchanger 20 preheating the saline water feed entering evaporation chamber 16.

Absorption refrigeration system 12 operates with a refrigerant (e.g. LiBr—H$_2$O) in a pressure range of preferably 1 to 16 kPa. Heat energy required by generator 38 of absorption refrigeration system 12 is preferably supplied by solar collector 36 (e.g. flat panel) during sunlight hours and by auxiliary electric or gas heater 40 during non-sunlight hours. Solar collector 36 maintains generator 38 at a specified temperature or range (e.g. between approximately 80-110° C.). Heat rejected by condenser 42 of absorption refrigeration system 12 maintains thermal energy storage 14 at a specified temperature or range (e.g. between approximately 50-70° C.) to serve as the low grade heat source for the desalination process. Evaporator 44 of absorption refrigeration system 12 feeds the cooling load. Thus, the preferred embodiment of the present invention performs two functions of continuous desalination and cooling with minimal amounts of external nonrenewable energy input.

Mass and Energy Balances

The preferred embodiment was developed based on mass and energy balances. Thermodynamic analysis of the preferred embodiment was performed through computer simulations using Extend®, manufactured by ImagineThat Inc., San Jose, Calif. and EES®, manufactured by F-Chart Software, Madison, Wis. simulation software.

Desalination System

An evaporator area of 5 m$^2$ and a height of 0.25 m were considered. In all calculations, the reference temperature was assumed to be 25° C. All heat exchangers were assumed to have 80% efficiency. The following mass and heat balance equations apply to the different components:

Mass balance on water in the evaporation chamber:

$$\frac{d}{dt}(\rho V) = \rho_i \dot{V}_i - \rho_w \dot{V}_w - \rho_e \dot{V}_e \qquad (1)$$

Mass balance on solute in the evaporation chamber:

$$\frac{d}{dt}(\rho C V)_s = \rho_i C_i \dot{V}_i - \rho_w C_w \dot{V}_w \qquad (2)$$

Heat balance for the evaporation chamber:

$$\frac{d}{dT}(\rho c_p V T)_s = Q_{In} + (\rho c_p T)_i \dot{V}_i - (\rho c_p T)_w \dot{V}_w - Q_E - Q_L \qquad (3)$$

Evaporation rate is expressed by (Bemporad, 1995):

$$q_e = \frac{\alpha_m A}{\rho_f}\left[f(C_s)\frac{p(T_s)}{(T_s+273)^{1/2}} - \frac{p(T_f)}{(T_f+273)^{1/2}}\right] \quad (4)$$

where, $p(T)=e^{(63.042-7139.6/(T+273)-6.2558\,ln(T+273))}*10^2$ Pa

In the above equations, subscripts e, i, and w, represent evaporator outlet, inlet, and withdrawal conditions, respectively; f and s represent freshwater and saline water respectively. The variables are defined as follows:

V=volume of water in the evaporation chamber [m³]
V̇=volumetric flow rate [m³/hr]
ρ=density [kg/m³]
$c_p$=specific heat capacity of saline water [kJ/kg-° C.]
C=solute concentration [%]
$T_s$=saline water temperature in the evaporator chamber [° C.]
T=temperature [° C.]
$q_e$=evaporation rate [m³/s]
A=area of the evaporation chamber [m²]
αm=an experimental coefficient [$10^{-7}$–$10^{-6}$ kg/m²-Pa-s-$K^{0.5}$] (11)
f(C)=correlation factor for the presence of solute concentration [%]
$Q_{In}$=energy input from thermal energy storage [kJ/hr]
$Q_L$=energy losses from evaporation chamber [kJ/hr]
$Q_E$=energy used for evaporation [kJ/hr]
Energy used for evaporation is given by:

$$Q_E = 3{,}600 \rho_f h_L(T_S) q_e \quad (5)$$

where, $h_L(T)$ is the latent heat of evaporation [kJ/kg] given by:

$$h_L(T)=[(3146-2.36(T+273°\text{ K})]$$

The desalination efficiency, $\eta_d$, is defined as:

$$\eta_d = \frac{m_e h_L}{\sum Q_{In} \Delta t} \quad (6)$$

where,
$m_e$=mass of desalinated water produced over a period of time [kg]
$h_L$=latent heat of evaporation at saline water temperature [kJ/kg]
$\Sigma Q_{In}\Delta t$=energy provided by the thermal energy storage over a period of time [kJ]

Expressions for density, enthalpy and pressure variations are presented below.

Density variation with temperature and concentration is given as:

$$\rho(T,C) = \rho_0(1 - \beta_T \Delta T_0 + \beta_C \Delta C_0)$$

where, $\Delta T_0$ and $\Delta C_0$ are variations from reference property values, of density.
$\beta_T$=5.10-4 C-1, thermal expansion coefficient
$\beta_C$=8.10-3%-1, solutal expansion coefficient
Effect of concentration on specific heat is given as:

$$c_P(C) = \alpha_2 C + \beta_2$$

where, $\alpha_2$=-30.10 J kg-1 0C-1
$\beta_2$=4178.4 J kg-1 0C-1
Evaporation energy is given as:

$$Q_e = \rho_f h_{fg}(T_s) q_e \text{ [kJ/hr]}$$

Latent heat of evaporation is given as:

$$h_{fg}(T)=10^3 * [(3146-2.36(T+273°\text{ K})]\text{J/kg}$$

The average heat transfer from the tips of the fins is given by (Rohsenow 1985):

$$Nu_s = c Ra_s^b$$

where Nu=Nusselt number, Ra=Rayleigh Number and b and c are constants b=0.29; c=0.44+0.12/ϵ; ϵ=Dco/Dfin
This equation is valid for 2<Ras<104 and 1.36<1/ϵ<3.73
Rayleigh number is given as (Incropera, 2002):

$$Ra_s = \frac{g\beta(T_{co}-T_a)S^3}{\alpha\gamma}\frac{S}{D_{fin}}$$

$$\beta = \frac{1}{273+T_a}$$

where g=local acceleration due to gravity (m/sec²)
β=temperature coefficient, 1/° K.
α=thermal diffusivity, m²/s
Υ=kinematic viscosity, m²/s
$T_a$ and $T_{co}$=temperatures of the ambient and condenser respectively, ° K.
S=distance between the successive fins, m Condenser Calculations: Average heat transfer through the cylinder surfaces and fins is given by:

$$Nu_s = \frac{Ra_s}{12\pi}\left\{2 - \exp\left[-\left(\frac{c1}{Ra_s}\right)^{3/4}\right] - \exp\left[-\beta\left(\frac{c1}{Ra_s}\right)^{3/4}\right]\right\}$$

where $1.67 < 1/\xi < \infty$ $\beta = 0.17\xi + \exp(-4.8\xi)$ $c1 = \left[23.7 - 1.1(1+152\xi^2)^{1/2} + \beta\right]^{4/3}$ The rate of heat transferred from the condenser prime surface and fins can be calculated as:

$$Q_c = [h_{co,tip} N A_{f,tip} \eta_f + h_{co} N A_{f,sides} \eta_f + h_{co} A_b](T_{co}-T_a)$$

where $h_{co,tip}$, $h_{co}$=heat transfer through the tips and base or sides
N=number of fins
$A_b$, $A_{f,sides}$, and $A_{f,tip}$=areas of base, fin sides and tip respectively
$\eta_f$=efficiency of fins
For turbulent free convection for Ra>109, $$Nu = c(Ra)^{0.333}$$

where c=0.10
For $f_{in}$ efficiency (Donald Q. Kern, 1972):

$$\phi = (ro-ri)^{3/2}(2h/kAp)^{1/2}$$

$$\rho = (ri/ro)$$

where $r_i$ and $r_o$=inner and outer radius of fins respectively, m
h=heat transfer coefficient trough the fin, w/m²-° K.
k=heat transfer coefficient trough the surface, w/m-° K.
$A_p$=Area of the fins $$\eta = (\phi, \rho)$$

Absorption Refrigeration System

Absorption refrigeration system 12 is preferably driven by solar energy during sunlight hours and by auxiliary electric or gas heater 40 during non-sunlight hours, although any type of power may be utilized. The efficiency of solar collectors is expressed in terms of solar fraction, which is the contribution of solar energy to the total load in terms of the fractional reduction in the amount of extra energy that must be supplied. A storage tank volume of approximately 0.125 m$^3$/m$^2$ was considered and the optimum area of solar collectors required was found from a solar fraction graph. The optimum number of collectors was the lowest number of collectors for which a 100% solar fraction was achieved at the hour maximum solar radiation. Additional energy for heating and pumping was required for condenser 42 of absorption refrigeration system 12 to dissipate heat at approximately 55° C. The pumping requirements were calculated using EES® software.

Heat balance across solar collection system:

$$\frac{d(m_S C_{ps} T_{S1})}{dt} = [F_R A_p \{(\tau\alpha) I_S - U_L(T_{gs} - T_a)\} - U_S A_S(T_{S1} - T_a) - m_R C_{pr}(T_{S1} - T_{gs})] \quad (7)$$

where, $m_s$=mass of water in storage tank [kg]
$C_{ps}$=specific heat of water in storage tank [kJ/kg–°C.]
$T_{S1}$=temperature of water in storage tank [° C.]
$F_R$=heat removal factor [dimensionless]
$A_p$=area of solar panels [m$^2$]
$\tau$=transmitivity of glass [dimensionless]
$\alpha$=absorptivity of water [dimensionless]
$I_S$=solar energy [kJ/hr–m$^2$]
$U_L$=heat loss coefficient [kJ/hr–m$^2$–° C.]
$T_{gs}$=temperature of the water from the generator [° C.]
$T_a$=ambient temperature [° C.]
$U_S$=heat losses from the surface of storage tank [kJ/hr–m$^2$–° C.]
$A_S$=surface area of storage tank [m$^2$]
$m_R$=flow rate of recycling water [kg/hr]
$C_{pr}$=specific heat of recycling water [kJ/kg–° C.]

Thermal Energy Storage:

Sensible heat thermal energy storage 14 stores heat rejected by the absorption refrigeration system-condenser 42. The optimal volume of thermal energy storage 14 to maintain evaporation chamber 16 at the desired temperature differential was determined by solving the heat balance for thermal energy storage 14 by trial and error.

Heat balance for thermal energy storage 14:

$$\frac{d}{dt}(\rho C_p v T)_{TES} = Q_R - Q_{In} - Q_{L1} \quad (8)$$

where, $Q_R$=heat rejected by condenser in the absorption refrigeration system [kJ/hr]
$Q_{L1}$=energy losses from the thermal energy storage surface [kJ/hr]
$C_p$=specific heat of the water in the TES [kJ/kg–° C.]
$v$=volume of the thermal energy storage [m$^3$]

Results:

The model equations were solved using the fixed parameters listed in FIG. 2 and for a particular site. Previous studies have shown that the effect of water depth in evaporation chamber 16 did not have any significant effect on the evaporation rate. This is in contrast to the traditional solar stills, where the water volume provided energy storage that is required for continued evaporation during non-sunlight hours. Since the preferred embodiment does not depend on solar energy for continuous operation, the effect of water depth was not taken into account.

First, results of an example case where the model equations were solved for the reference parameters listed in FIG. 2 are presented. In this example case, the withdrawal rate was fixed at approximately 2.5 kg/hr (≈50%). These results demonstrate the effectiveness of the preferred embodiment. Then, the total energy consumption of the preferred embodiment was analyzed and compared to that of a multi-stage flash distillation process. Finally, the effect of withdrawal rate on the design and performance of the preferred embodiment is presented.

Heat Balance for Evaporation Chamber

Figure 3:
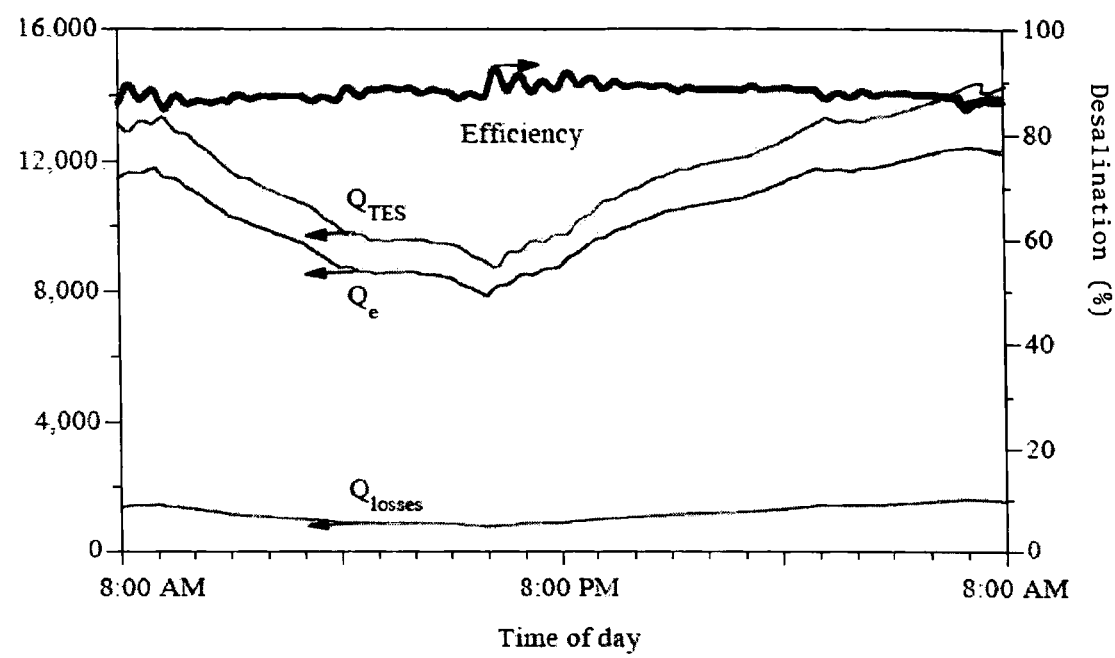
FIG. 3 is a chart showing heat transfers and efficiency for the desalination system of the present invention over 24 hours.

The heat balance for evaporation chamber 16 is described by Equation 3. FIG. 3 shows the variations in heat provided by thermal energy storage 14, the heat consumed for evaporation, and the heat lost over a 24-hr period for a summer day, when the ambient temperature ranged from between approximately 25 to 37° C. The desalination efficiency defined by Equation 6 is also indicated in FIG. 3 by the bold line. As expected, the heat lost by evaporation chamber 16 was higher during non-sunlight hours than that during sunlight hours due to lower ambient temperatures during non-sunlight hours. Under the example conditions, the energy available for desalination was about 12,500 kJ/hr (=3.45 kW) which was the waste heat rejected by condenser 42 in absorption refrigeration system 12. However, the net heat transfer was dependent on the temperature gradient between the transfer medium and the heat source. The actual mass of water that could be evaporated in evaporation chamber 16 and hence, the desalination efficiency, depended on the heat input from thermal energy storage 14, the ambient temperature at which the condensation took place, and the brine withdrawal rate. Since the driving force for evaporation is the temperature differential, between evaporation chamber 16 and condenser 42, the heat input to evaporation chamber 16 during the day is lower than that input during the night. During the night, both the ambient temperature and the freshwater temperature are low, favoring a higher desalination rate, thus resulting in higher heat input and vice versa.

Figure 4:
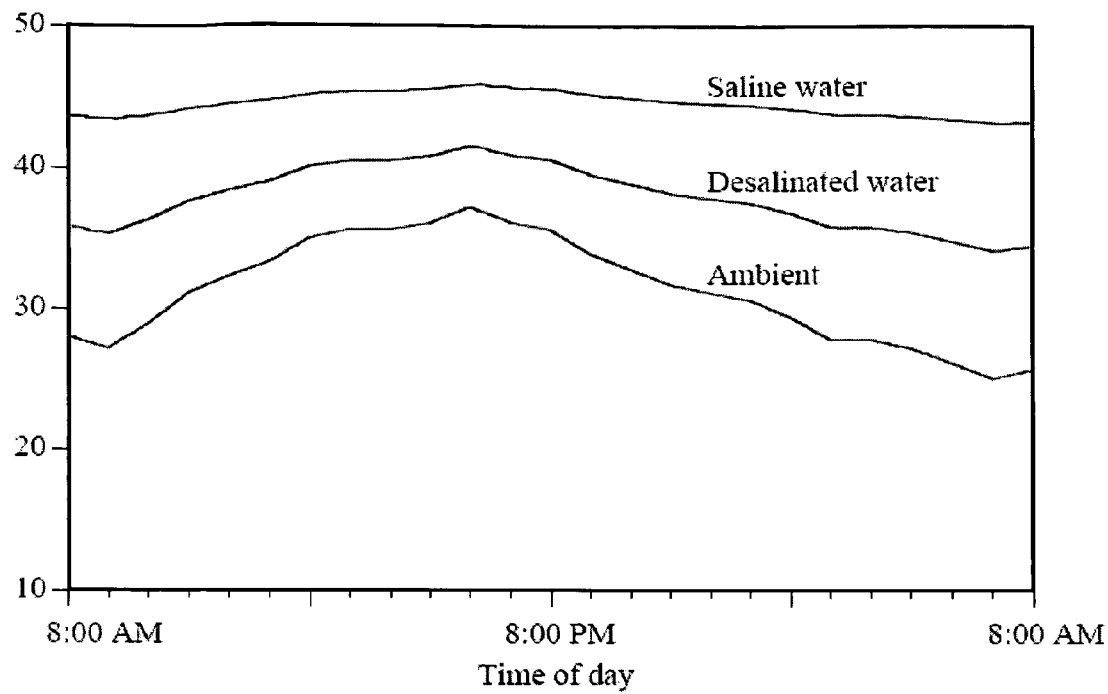
FIG. 4 is a chart showing variations of desalinated water temperature and saline water temperature with respect to ambient temperature over 24 hours for the desalination system of the present invention.

The temperature variations in the saline water in evaporation chamber 16 and the desalinated water with respect to ambient temperature over a 24-hr period are shown in FIG. 4. The temperature of saline water varied from between approximately 43.5 to 46° C. and the ambient temperature ranged from between approximately 25 to 37° C. while the fresh water temperatures ranged from between approximately 35 to 40° C. FIG. 4 shows that thermal energy storage 14 was able to maintain the approximately 10° C. temperature differential between the saline water side and the desalinated water side. It is noted that the ambient temperature is an important variable because condensation occurs at the ambient temperature, which indirectly determines the desalination rate in this process.

Operating Conditions of Absorption Refrigeration System

Absorption refrigeration system 12 is designed for two functions: for maintaining thermal energy storage 14 at the desired temperature and for providing the cooling load. As such, absorption refrigeration system 12 operates under slightly different conditions compared to the traditional systems used for cooling alone. Operating conditions for a typical absorption refrigeration system used in cooling and the conditions for absorption refrigeration system 12 are compared in FIG. 5, for the same cooling load of approximately 3.25 kW. The notable difference is the pressure ranges between approximately 1 and 6.3 kPa versus about 1.4 to 15.75 kPa respectively.

Volume of Thermal Energy Storage

Figure 6:
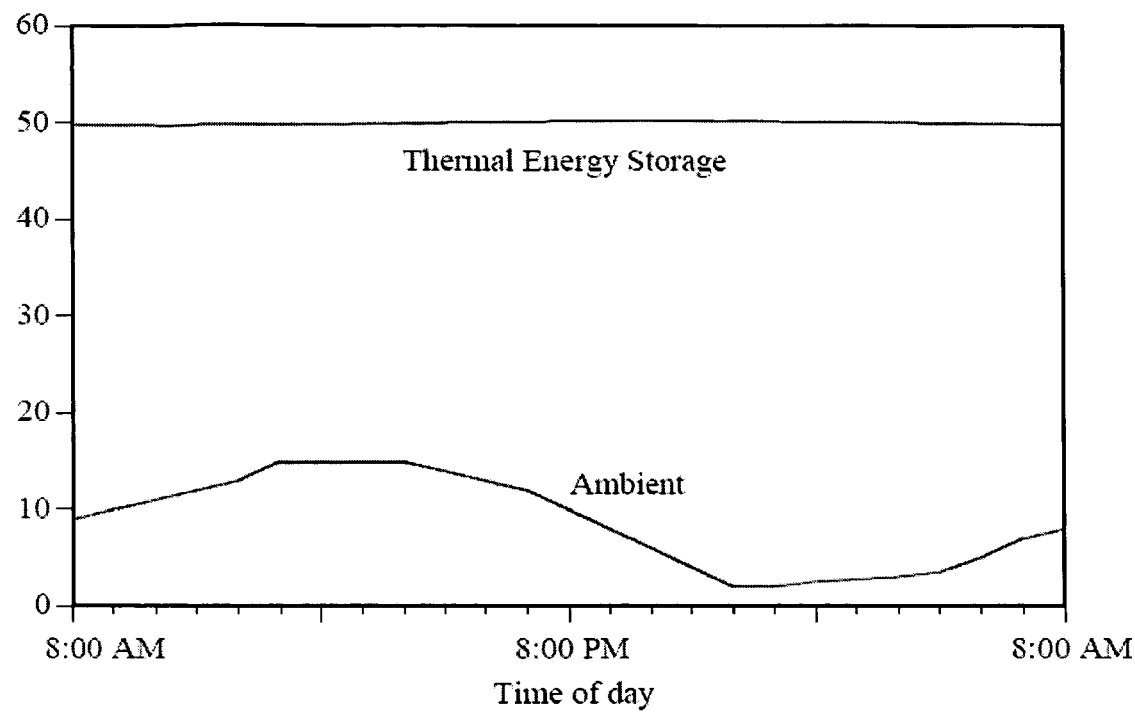
FIG. 6 is a chart showing ambient temperature versus thermal energy storage temperature over 24 hours for a typical thermal energy storage and in the preferred embodiment.

Winter conditions were assumed to determine the volume of thermal energy storage 14 necessary to provide the heat energy to evaporation chamber 16. Solving Equation 8 by trial and error so that the temperatures at the beginning and the end of a 24-hr period would be within approximately ±0.01° C., the volume of thermal energy storage 14 was found to be approximately 10 m$^3$. The heat demand by evaporation chamber 16 on thermal energy storage 14 varied from between approximately 8,700 and 14,200 kJ/hr over a 24-hour period shown in FIG. 2; yet, as shown in FIG. 6, thermal energy storage 14 volume of approximately 10 m$^3$ was found to be adequate to maintain its temperature at approximately 50° C. throughout the same period to provide the energy needs of evaporation chamber 16.

Energy Requirements

An embodiment of the invention may require additional non-renewable energy for the following: auxiliary heat energy for generator 38 (=approximately 192 kJ/kg of desalinated water) plus mechanical energy to circulate heat transfer medium between thermal energy storage 14 and evaporation chamber 16 (=approximately 14 kJ/kg of desalinated water); to circulate the heat transfer medium between thermal energy storage 14 and condenser 18 (=approximately 2 kJ/kg of desalinated water); and to pump the refrigerant in absorption refrigeration system 12 (=approximately 0.04 kJ/kg of desalinated water). Hence, the total additional energy required to maintain thermal energy storage 14 at the desired conditions is approximately 208 kJ/kg of desalinated water produced. In comparison, multi-stage flash distillation process would require a heat energy of approximately 294 kJ/kg of desalinated water plus a mechanical energy of approximately 44 kJ/kg of desalinated water, for a total of approximately 338 kJ/kg of desalinated water. Thus, the present invention requires about 60% of the energy required by the multi-stage flash distillation process. A comparison between the two processes is summarized in FIG. 7.

Solar Collector for Absorption Refrigeration System

Figure 8:
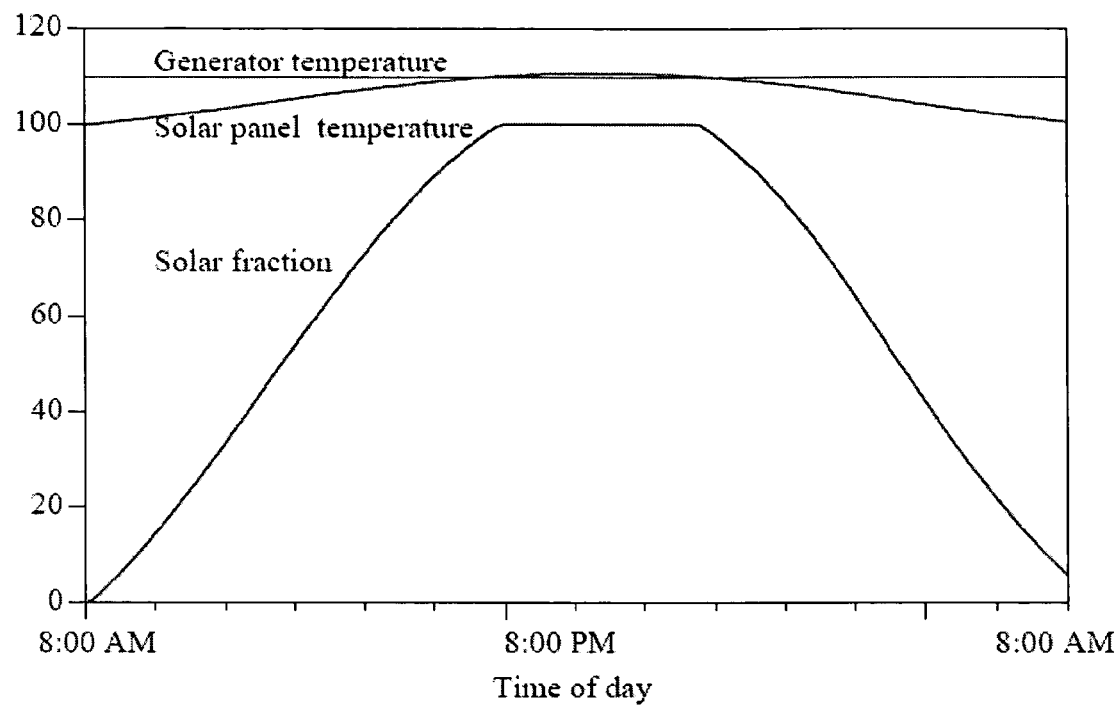
FIG. 8 is a chart showing solar fraction and optimum solar panel area for a typical absorption refrigeration system and in the preferred embodiment.
Figure 9:
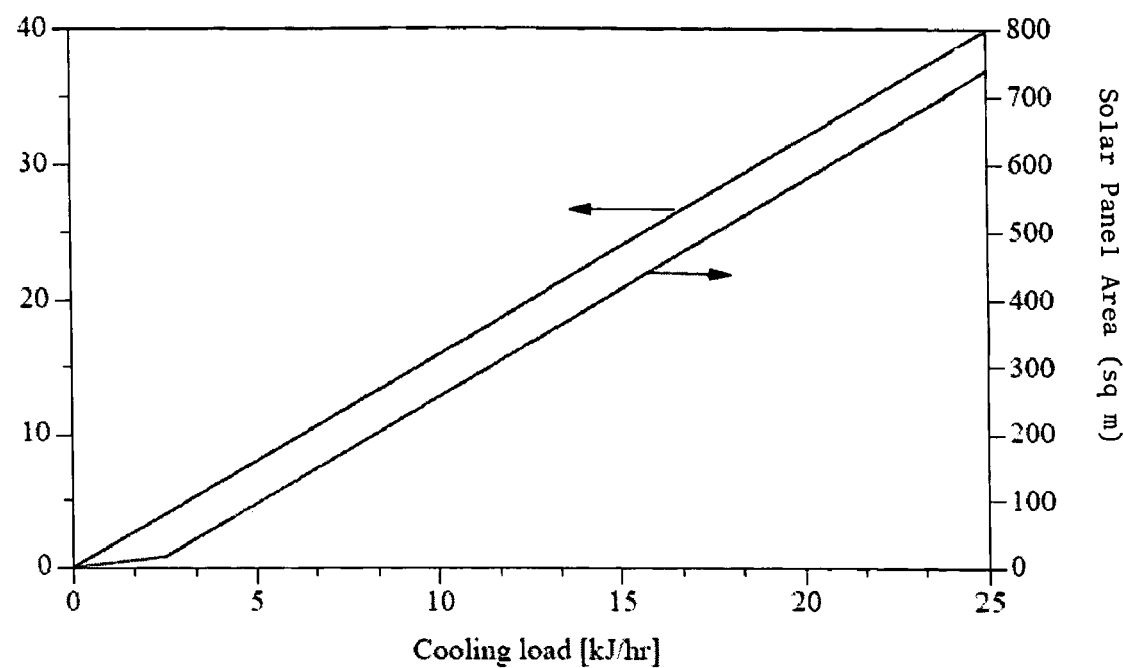
FIG. 9 is a chart showing desalination rates for different cooling loads and solar panel areas for a typical absorption refrigeration system and in the preferred embodiment.

Solar collector 36, augmented by auxiliary electric heater 40, is sized to provide for thermal energy storage 14 and the cooling load. The temperature of storage tank 46 of solar collector 36 is set to a particular temperature or range (e.g. between approximately 110-115° C.) in order to maintain generator 38 temperature at a particular temperature or range (e.g. between approximately 100-110° C.). The energy to be provided by auxiliary heater 40 is equal to the difference between the energy required by generator 38 and that can be collected from solar isolation. FIG. 8 illustrates this difference and the solar fraction, over a 24-hr period. The optimal area of the collectors can be found from Equation 7. For the conditions described herein, solar collector area of approximately 25 m$^2$ can satisfy a cooling load of approximately 3.25 kW, at an average desalination rate of approximately 4.3 kg/hr. The relationships between desalination rate, solar panel area, and cooling load are presented in FIG. 9.

Brine Withdrawal vs. System Performance

Figure 10:
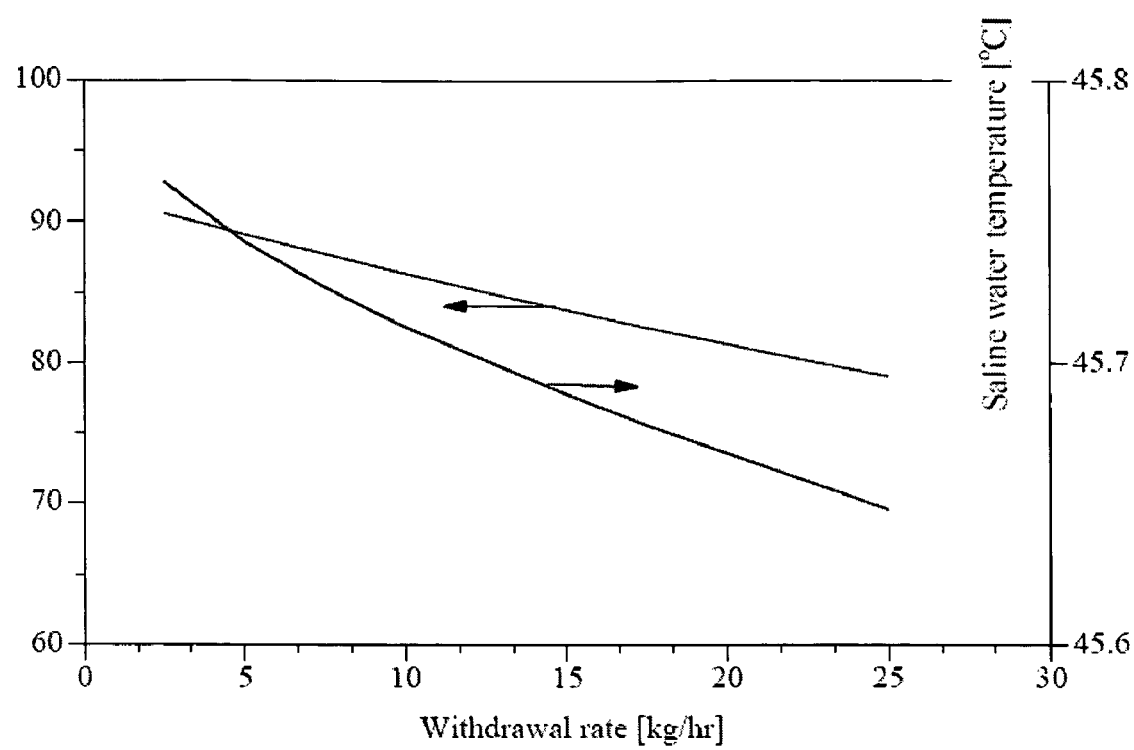
FIG. 10 is a chart showing the effect of withdrawal rate on desalination efficiency and saline water temperature for the desalination system of the present invention.
Figure 11:
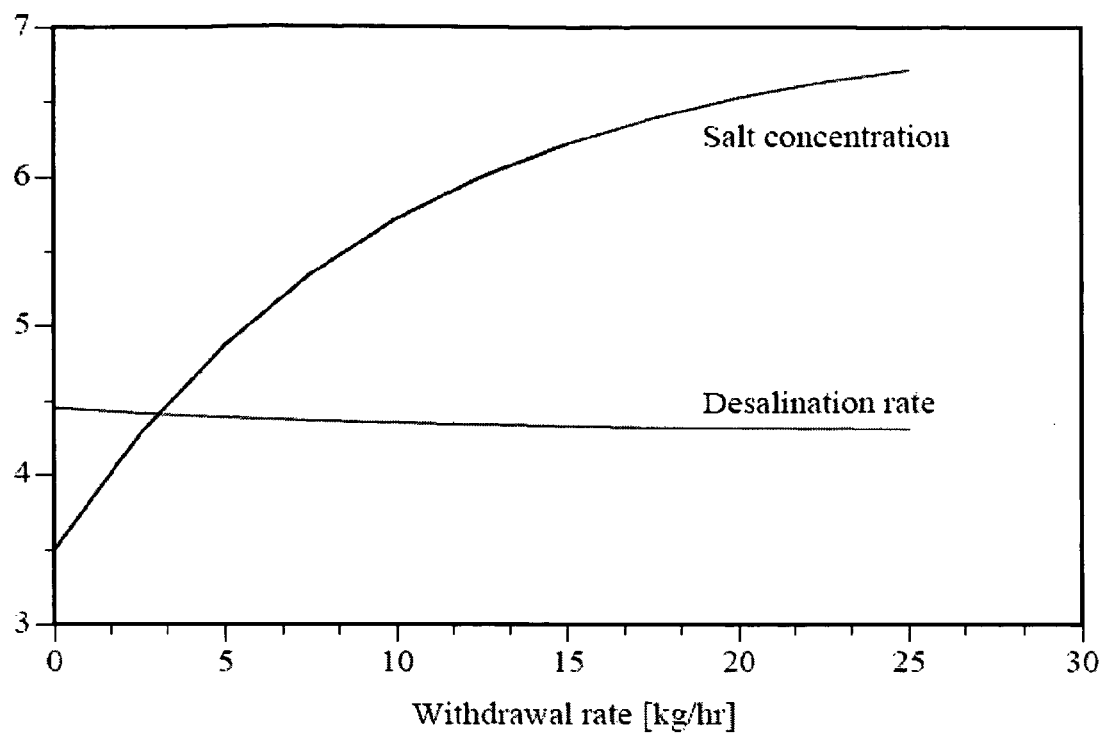
FIG. 11 is a chart showing the effect of withdrawal rate on concentration and desalination efficiency for the desalination system of the present invention.

Brine withdrawal rate is the primary control variable in this system, which has positive as well as negative impacts on the performance of the system. At low withdrawal rates, salts build up in evaporation chamber 16, and evaporation rates decrease as shown by Equation 4. High salt levels also reduce the enthalpy of saline water that can further reduce evaporation. For example, when salinity increases by approximately 1%, evaporation is also reduced by about the same percentage. Even though better salt removal can be achieved with higher withdrawal rates, large amounts of sensible heat are also removed from evaporation chamber 16, resulting in decline of evaporation chamber 16 temperature. Simulation results presented in FIG. 10 show the decline in evaporation chamber 16 temperature and in desalination efficiency with increasing withdrawal rate. For example, the desalination efficiency dropped from between approximately 90.5% and 80% when the withdrawal rate increased from between approximately 2.5 kg/hr and 25 kg/hr. FIG. 11 shows the salt buildup with time and the resulting decline in desalination rate. Similar observations have been reported previously.

Figure 12A:
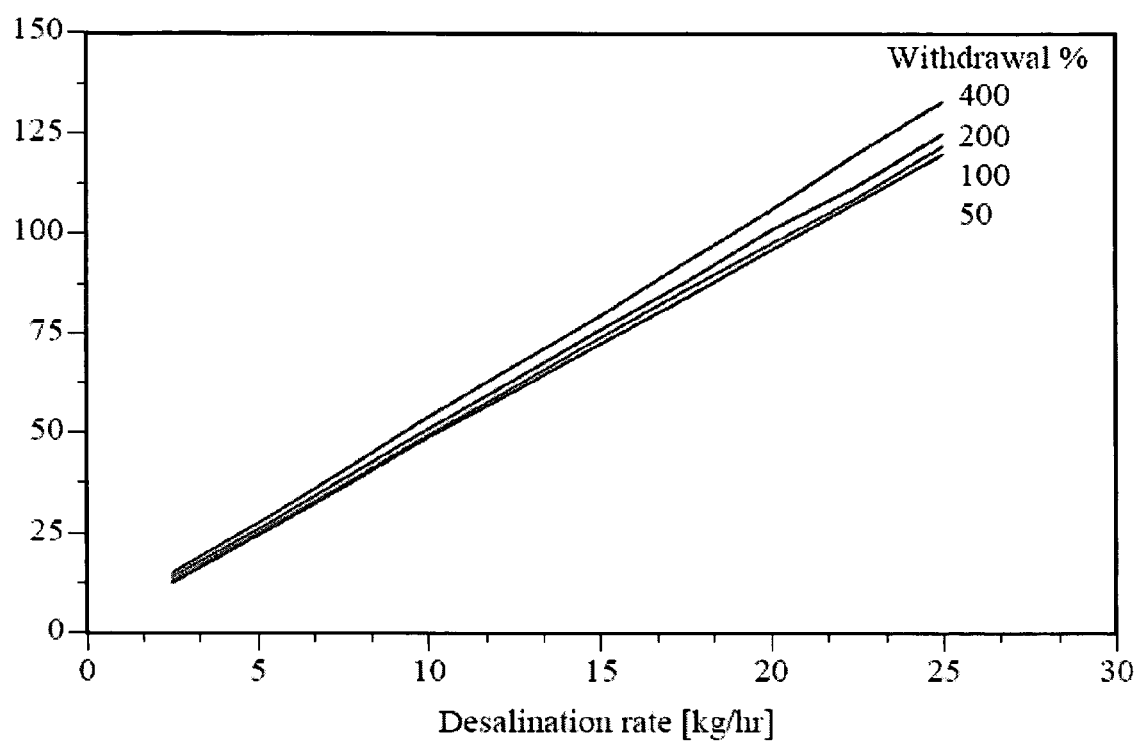
FIG. 12A is a chart showing solar panel area versus desalination rate at different withdrawals for the desalination system of the present invention.
Figure 12B:
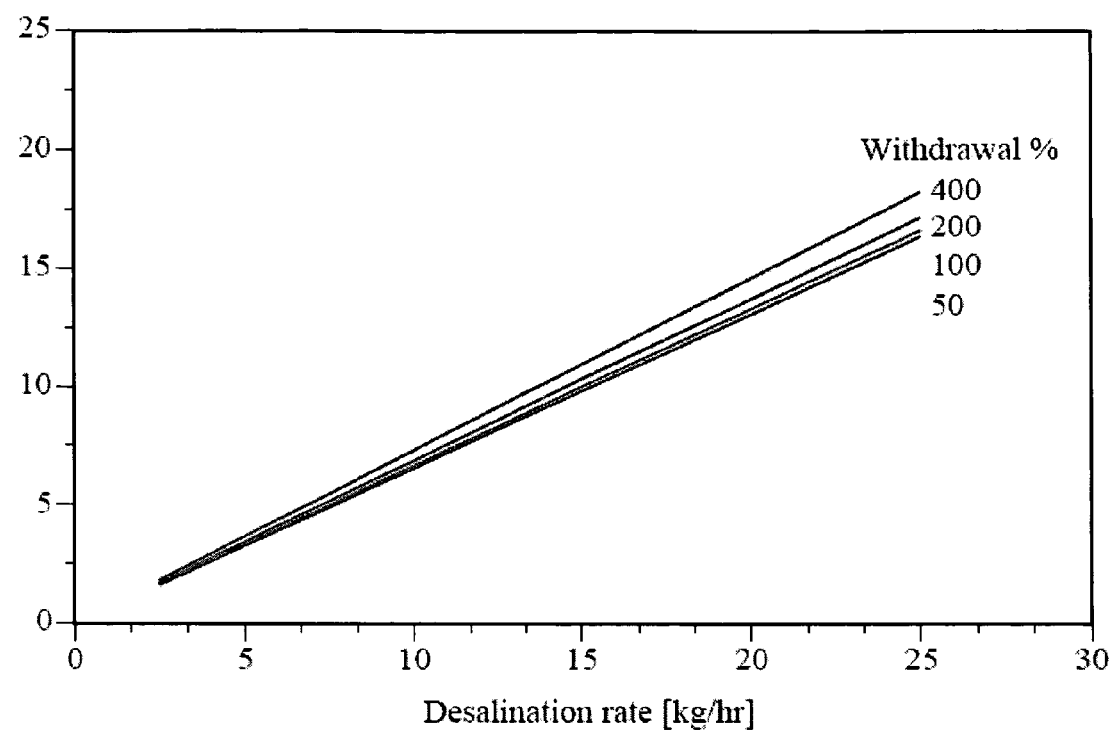
FIG. 12B is a chart showing cooling load versus desalination rate at different withdrawals for the desalination system of the present invention.

Further simulations were conducted to evaluate the effect of withdrawal rate on desalination rate, cooling load, solar collector area, and auxiliary heat requirement. As shown in FIG. 12, cooling load and solar panel area are not sensitive to withdrawal rate in the range of between approximately 50-200%. For a given desalination rate, even though the cooling load at a withdrawal rate of approximately 200% is higher than that at approximately 100%, the auxiliary heat addition is also higher. In addition, the solar collector area is also higher. As discussed before, the desalination efficiency also decreases. Based on these results, a withdrawal rate of approximately 100% is an acceptable rate to minimize salt buildup and maintain system performance.

In summary, model simulations show that the preferred embodiment can achieve a desalination efficiency of at least approximately 85% and higher (e.g. approximately 85-90%) at a brine withdrawal rate of approximately 70-100% with an energy consumption of less than approximately 250 kJ/kg (e.g. between approximately 150-300 kJ/kg) of freshwater from seawater. The energy requirements for the preferred embodiment are less than that are required for a multi-stage flash distillation process. Based on the results from the example, an approximate 100% withdrawal rate could prevent scale formation that could reduce the evaporation rate. A typical unit with a thermal energy storage volume, the volume calculated by solving a heat balance using trial and error (e.g. between approximately 10-20 m$^3$), can produce fresh water at between approximately 4.5 kg/hr and provide a cooling load of between approximately 3.25 kW with a solar panel area of between approximately 25 m$^2$. The preferred embodiment minimizes non-renewable energy usage and may be improved further by incorporating a double or triple-effect configuration.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents An example of a configuration that has been demonstrated by a prototype is described in Example 1. The entire disclosures of all references, applications, patents, and publications cited above are hereby incorporated by reference.

EXAMPLE 1

A prototype unit was constructed and experiments were conducted using direct solar energy and photovoltaic energy as heat sources. Desalination was performed on a continuous basis over 24 hours a day for several months. This prototype comprised of columns that were 10 m, equivalent to the local barometric head. The temperature of the head space of the feed water column was maintained at approximately 40-50° C., while the desalinated water column was maintained at approximately 35-45° C. The pressure in the evaporation chamber remained at approximately 0.085 atm. The specific energy required by this prototype was approximately 3,370 kJ/kg of desalinated. This system was run entirely on solar energy with direct solar heat during sunlight hours and with a 350-W DC heater powered by batteries that were charged by the photovoltaic panels during the day time. This example system was able to recover potable quality water meeting United States Environmental Protection Agency drinking water standards from the effluent of a municipal wastewater treatment plant.

What is claimed is:

1. A desalination system comprising:
    a desalination unit, said desalination unit comprising an evaporation chamber for evaporating saline water disposed at a barometric height above at least three columns, one of said columns comprising a saline water column connected to said evaporation chamber, another of said columns comprising a brine withdrawal column connected to said evaporation chamber and another of said columns comprising a desalinated water column connected to a condenser;
    each of said columns comprising a constant-level holding tank, said saline water column comprising a saline water tank, said brine withdrawal column comprising a brine tank, and said desalinated water column comprising a desalinated water tank;
    said condenser attached to said evaporation chamber, said condenser condensing desalinated water, and a heat exchanger, attached to said evaporation chamber, said heat exchanger pre-heating the saline water feed;
    a thermal energy storage system for storing heat rejected by an absorption refrigeration system, said thermal energy storage system maintained at a specified temperature range; and
    a low grade heat source for powering said desalination system comprising the heat rejected by said absorption refrigeration system.

2. The system of claim 1 wherein said desalination system runs continuously.

3. The system of claim 1 wherein said specified temperature range is between about 40-50° C.

4. The system of claim 1 wherein said absorption refrigeration unit operates at a pressure range of between about 1.4 to 15.75 kPa.

5. The system of claim 1 wherein heat input to said evaporation chamber is provided by said thermal energy storage system.

6. The system of claim 1 not having a pump except for an initial starting pump disposed on said low grade heat source.

7. The system of claim 1 wherein the specified temperature range of the thermal energy storage system comprises a temperature range of about 50-70° C.

8. A method of desalinating comprising the steps of:
    operating a desalination unit, the desalination unit comprising an evaporation chamber for evaporating saline water disposed at a barometric height above at least three columns, one of the columns comprising a saline water column connected to the evaporation chamber, another of the columns comprising a brine withdrawal column connected to the evaporation chamber and another of the columns comprising a desalinated water column connected to a condenser, each of the columns comprising a constant-level holding tank, the saline water column comprising a saline water tank, the brine withdrawal column comprising a brine tank, and the desalinated water column comprising a desalinated water tank, the condenser attached to the evaporation chamber, the condenser condensing desalinated water, and a heat exchanger, attached to the evaporation chamber, the heat exchanger pre-heating the saline water feed;
    storing heat rejected by an absorption refrigeration system in a thermal energy storage unit;
    maintaining a specified temperature range of the thermal energy storage unit; and
    powering the desalination unit using a low grade heat source comprising utilizing the heat rejected by the absorption refrigeration system.

9. The method of claim 8 comprising running the desalination unit continuously.

10. The method of claim 8 comprising desalinating saline water at a temperature range of about 40-50° C.

11. The method of claim 8 comprising providing a cooling load from the absorption refrigeration unit.

12. The method of claim 8 comprising operating the absorption refrigeration unit at a pressure range of between about 1.4 to 15.75 kPa.

13. The method of claim 8 comprising maintaining a temperature range of about 50-70° C. in the thermal energy storage unit.

* * * * *